(12) United States Patent
Johnson et al.

(10) Patent No.: US 11,625,715 B2
(45) Date of Patent: Apr. 11, 2023

(54) SECURITY DEVICES, SYSTEMS, AND METHODS FOR DYNAMIC TRANSACTION CARDS

(71) Applicant: Capital One Services, LLC, McLean, VA (US)

(72) Inventors: Molly Johnson, Alexandria, VA (US); Adam Vukich, Alexandria, VA (US); James Zarakas, Centreville, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 189 days.

(21) Appl. No.: 16/919,615

(22) Filed: Jul. 2, 2020

(65) Prior Publication Data

US 2022/0005024 A1 Jan. 6, 2022

(51) Int. Cl.
*G06Q 20/38* (2012.01)
*G06Q 30/00* (2012.01)
*G06Q 20/34* (2012.01)
*G06Q 20/40* (2012.01)
*G06Q 20/20* (2012.01)
*G06Q 20/10* (2012.01)
(Continued)

(52) U.S. Cl.
CPC ....... *G06Q 20/385* (2013.01); *G06K 19/0723* (2013.01); *G06Q 20/341* (2013.01); *G06Q 20/357* (2013.01); *G06Q 20/382* (2013.01); *G06Q 20/4015* (2020.05); *G06Q 30/0185* (2013.01); *H04W 4/029* (2018.02); *G06Q 20/108* (2013.01); *G06Q 20/202* (2013.01); *G06Q 20/326* (2020.05); *G06Q 20/352* (2013.01); *G06Q 2220/00* (2013.01)

(58) Field of Classification Search
CPC ..... G06Q 20/341; G06Q 20/356–3567; G06Q 20/385; G06Q 20/357; G06Q 20/382; G06Q 20/4015; G06Q 30/0185; G06Q 20/108; G06Q 20/202; G06Q 20/326; G06Q 20/352; G06Q 2220/00; G06Q 20/204; G06Q 20/227; G06Q 20/353; G06Q 20/3572; G06Q 20/3825; G06Q 20/4016; G06K 19/0723; G06K 19/0702; G06K 19/07705; G06K 19/07707; H04W 4/029; H04W 4/021; H04W 4/80; G07F 7/0813; G07F 7/0846; G07F 7/088; G07F 7/0893

See application file for complete search history.

(56) References Cited

U.S. PATENT DOCUMENTS 5,359,183 A * 10/1994 Skodlar ............ G06K 19/06046
 40/449
7,440,771 B2 10/2008 Purk
(Continued)

*Primary Examiner* — Eric T Wong
(74) *Attorney, Agent, or Firm* — Troutman Pepper Hamilton Sanders LLP; Christopher J. Forstner; John A. Morrissett

(57) ABSTRACT

A dynamic transaction card including: one or more light emitting elements; a transceiver; and an embedded microprocessor configured to: receive, from a transaction terminal, a location information corresponding to a current location of the transaction terminal; wirelessly transmit, via the transceiver and to a mobile device, the location information; receive an indication that a location-specific security concern exists; and in response to receiving the indication, control the one or more light emitting elements to display a visual indication corresponding to the location-specific security concern.

9 Claims, 7 Drawing Sheets

(51) Int. Cl.
  *G06Q 20/32* (2012.01)
  *G06Q 30/018* (2023.01)
  *G06K 19/07* (2006.01)
  *H04W 4/029* (2018.01)

(56) References Cited

U.S. PATENT DOCUMENTS

| | | | |
|---|---|---|---|
| 10,002,384 B1* | 6/2018 | Fink | G06Q 40/025 |
| 10,692,059 B1* | 6/2020 | Thome | G06Q 20/36 |
| 2009/0078777 A1* | 3/2009 | Granucci | G07F 7/0866 |
| | | | 235/492 |
| 2009/0314840 A1* | 12/2009 | Granucci | G06K 19/07 |
| | | | 235/492 |
| 2010/0102122 A1* | 4/2010 | Skowronek | G06Q 20/3278 |
| | | | 235/492 |
| 2011/0202463 A1* | 8/2011 | Powell | G06Q 20/382 |
| | | | 705/44 |
| 2011/0272474 A1* | 11/2011 | Mullen | G06K 19/07345 |
| | | | 235/492 |
| 2012/0143769 A1* | 6/2012 | Krishnan | G06Q 20/341 |
| | | | 705/14.27 |
| 2013/0048712 A1* | 2/2013 | Guillaud | G06K 19/07345 |
| | | | 235/492 |
| 2015/0220913 A1* | 8/2015 | Liu | G06K 19/0708 |
| | | | 235/492 |
| 2015/0379283 A1* | 12/2015 | Spodak | H04W 76/14 |
| | | | 705/51 |
| 2016/0041581 A1* | 2/2016 | Piccionelli | G09F 21/02 |
| | | | 345/156 |
| 2016/0086287 A1* | 3/2016 | Candelore | G06Q 40/12 |
| | | | 705/30 |
| 2016/0307089 A1* | 10/2016 | Wurmfeld | G06K 19/07707 |
| 2016/0307189 A1* | 10/2016 | Zarakas | G06K 19/02 |
| 2016/0358144 A1* | 12/2016 | Thrope | H04W 4/029 |
| 2017/0109620 A1* | 4/2017 | Wurmfeld | G06K 19/07722 |
| 2017/0109730 A1* | 4/2017 | Locke | G06K 19/02 |
| 2019/0114623 A1* | 4/2019 | Wurmfeld | G06Q 20/4016 |
| 2019/0139027 A1* | 5/2019 | Zarakas | G07F 7/0846 |
| 2019/0303917 A1* | 10/2019 | Locke | G06Q 20/405 |
| 2019/0354959 A1* | 11/2019 | Phillips | G06Q 20/341 |
| 2020/0279244 A1* | 9/2020 | Matta | G06Q 20/4016 |
| 2020/0285929 A1* | 9/2020 | Rahman | G06K 19/0718 |

* cited by examiner

SECURITY DEVICES, SYSTEMS, AND METHODS FOR DYNAMIC TRANSACTION CARDS

FIELD

The present disclosure relates to smart cards, and, more particularly, devices, systems, and methods that utilize networked systems to provide security to smart cards.

BACKGROUND

In the related art, transaction cards, such as credit cards or debit cards, include a magnetic stripe capable of storing limited data. Transaction cards may also include EuroPay-MasterCard-Visa ("EMV") cards having an integrated circuit, or EMV chip. The EMV chip in an EMV card may communicate with EMV-compliant terminals to conduct secure transactions. For example, information may be exchanged between the card and the terminal via the EMV chip, which may also require the entry of a PIN to complete a transaction. The EMV chip may dynamically store data previously stored on a magnetic strip, allowing for increased security associated with transaction cards. However, even with an EMV chip, related art transaction cards have very limited capabilities.

More recently, certain dynamic transaction cards have been provided in the related art that provide certain further capabilities, such as the ability to link to, and exchange information with, a mobile device. However, the related art has failed to provide advanced connectivity and security features. Accordingly, aspects of the present disclosure expand upon the dynamic transaction card to provide additional capabilities.

SUMMARY

In an embodiment, there is provided a dynamic transaction card including: one or more light emitting elements; a transceiver; and an embedded microprocessor configured to: receive, from a transaction terminal, a location information corresponding to a current location of the transaction terminal; wirelessly transmit, via the transceiver and to a mobile device, the location information; receive an indication that a location-specific security concern exists; and in response to receiving the indication, control the one or more light emitting elements to display a visual indication corresponding to the location-specific security concern.

In an embodiment, there is provided a method including: receiving, at a backend system, a transaction request for a dynamic transaction card; receiving, at the backend system, location information corresponding to the transaction request; determining, by the backend system, that a location-specific security concern exists; and instructing the dynamic transaction card to output a visual indication that the location-specific security concern exists.

In an embodiment, there is provided a mobile device including: a transceiver configured to communicate with a dynamic transaction card; a processor; and a memory having stored thereon computer instructions that, when executed by the processor, control the processor to: determine a location information associated with a current location of the dynamic transaction card; output, to a backend system, the location information; receive, from the backend system, an indication that a location-specific security concern exists; and output, to the dynamic transaction card, an instruction to display a visual indication that the location-specific security concern exists.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the present disclosure provide for location-specific alerts through a dynamic transaction card. For instance, a mobile device may determine a current location and communicate with a backend server to determine if any location-specific security concerns exist. If so, the mobile device may pair with the dynamic transaction card to issue an alert. The dynamic transaction card may retrieve the location information from a transaction terminal and provide the location information to the mobile device. The dynamic transaction card may receive a temporary account number to utilize for transactions conducted where location-specific security concerns exist.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
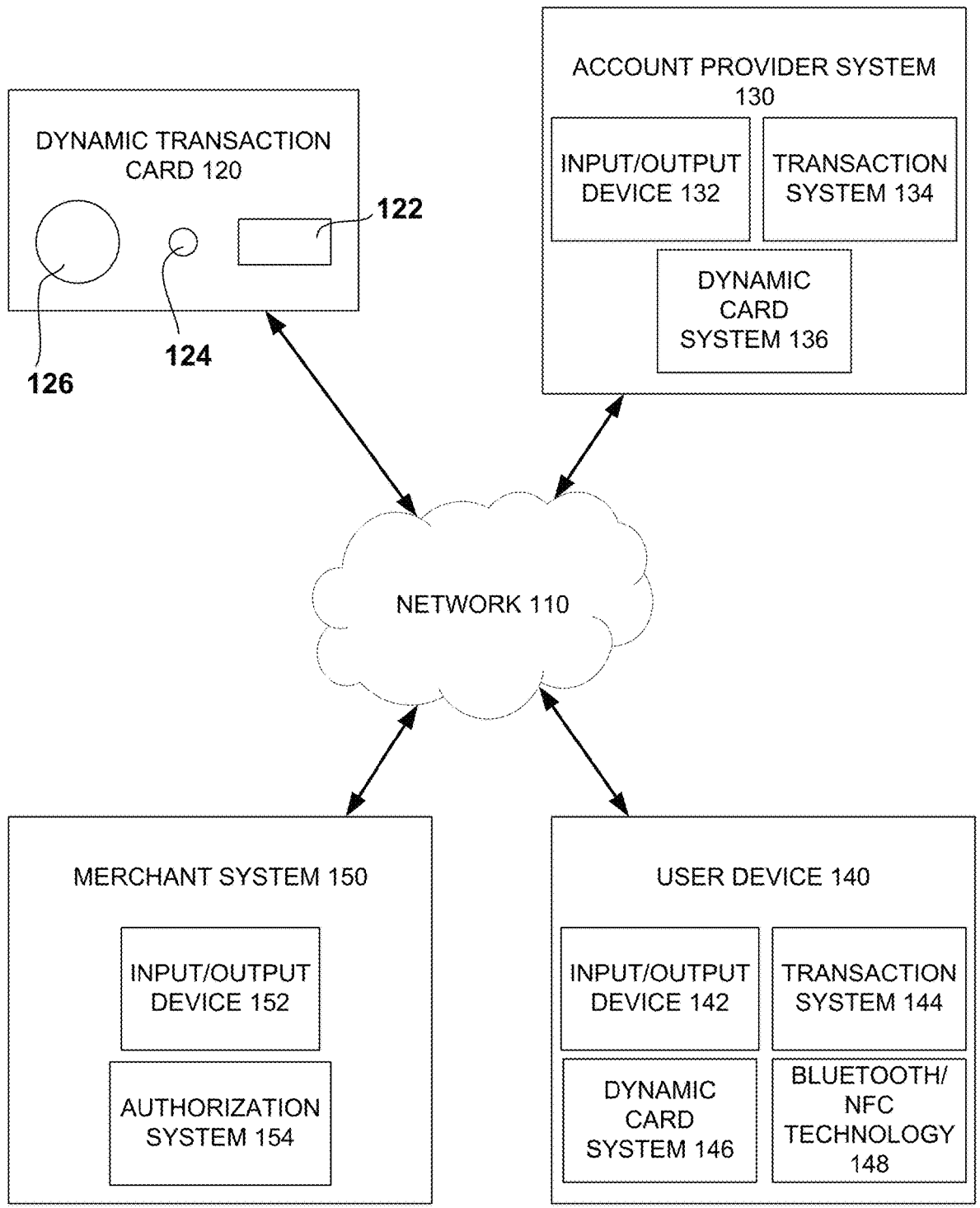
FIG. 1 is a diagram of an example system environment for implementing certain aspects of the present disclosure.

FIG. 1 depicts an example system 100 including a dynamic transaction card 120. As shown in FIG. 1, an example system 100 may include one or more dynamic transaction cards 120, one or more account provider systems 130, one or more user devices 140, and one or more merchant systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

User device 140 and/or merchant system 150 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Account provider system 130, user device 140, and/or merchant system 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Account provider system 130, user device 140, and/or merchant system 150 may include at least one central processing unit (CPU), which may be configured to execute computer program instructions to perform various processes and methods. Account provider system 130, user device 140, and/or merchant system 150 may include data storage, including for example, random access memory (RAM) and read only memory (ROM), which may be configured to access and store data and information and computer program instructions.

As depicted in FIG. 1, system 100 may include a dynamic transaction card 120. A dynamic transaction card may include any transaction card that is able to display alerts, notifications, and/or other output to a card holder via a display and/or LED lighting 126 and/or receive input to interact with the dynamic transaction card via, for example, one or more sensors 124. For example, sensor 124 may include a capacitive touch sensor, a piezoelectric sensor, an inductive sensor, load cells, a light sensor, a temperature sensor, a resistive touchscreen, including for example an analogue matrix real (AMR) sensors, and/or the like. Sensors 124 may include accelerometers and/or photosensors to detect motion input.

Dynamic transaction card 120 also may be composed of various materials that enable the entire exterior surface of card 120 to act as a sensor. A dynamic transaction card may be able to communicate with, for example, a mobile device using Bluetooth, NFC WiFi Direct and/or other related technologies. For example, communications between a dynamic transaction card and a mobile device may include methods, systems, and devices described in U.S. patent application Ser. No. 14/338,423 filed on Jul. 23, 2014, the entire contents of which are incorporated herein by reference.

A dynamic transaction card may be able to communicate with EMV terminals via contact points positions on the exterior of card 120, such as those positions on an EMV chip 122 located on the dynamic transaction card 120 or an EMV plate positions on the exterior of card 120 connected to an EMV processor within card 120. For example, contact points position on the exterior of card 120 may be directly connected and adjacent to an EMV processor EMV chip 122). In another example, the contact points positions on the exterior of card 120 may be connected to an EMV processor sing a form of wired connection (e.g., electrical wiring, plastic jumpers, and/or the like) such that the EMV processor may be positioned at any location in the interior of card 120 as described in U.S. Provisional Application 62/270,648, the entire contents of which are incorporated herein by reference.

A dynamic transaction card 120 may also include hardware components to provide contactless payments and/or communications. Example components of a dynamic transaction card 120 are discussed below in greater detail with reference to FIG. 2.

Account provider system 130 may include systems associated with, for example, a banking service company such as Capital One®, Bank of America®, Citibank®, Wells Fargo®, various community banks, and the like, as well as a number of other financial institutions such as Visa®, MasterCard®, and American Express® that issue credit and/or debit cards, for example, as transaction cards. Account provider system 130 may include and/or be connected to one or more computer systems and networks to process transactions. Account provider system 130 may include systems associated with financial institutions that issue transaction cards, such as a dynamic transaction card 120, and maintains a contract with cardholders for repayment. In various embodiments, an account provider system 130 may issue credit, debit, and/or stored value cards, for example. Account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Account provider system 130 may include an input/output device 132, a transaction system 134, and a dynamic transaction card system 136. Input/output device 132 may include for example, I/O devices, which may be configured to provide input and/or output to account provider system 130 (e.g., keyboard, mouse, display, speakers, printers, modems, network cards, etc.). Input/output device 132 also may include antennas, network interfaces that may provide or enable wireless and/or wire line digital and/or analog interface to one or more networks, such as network 110, over one or more network connections.

Transaction system 134 may include various hardware and software components to communicate between a merchant, acquisition system, account provider system, and/or a user device to process a transaction, such as a user purchase. Dynamic transaction card system 136 may include various hardware and software components, such as data storage (not shown) to store data associated with a dynamic transaction card (e.g., card number, account type, account balance, account limits, budget data, recent transactions, pairing data such as time and date of pairing with a mobile device, and the like) and cardholder data (e.g., cardholder name, address, phone number(s), email address, demographic data, and the like).

A user device 140 may be any device capable of communicating with a transaction card 120 via, for example, Bluetooth technology, NFC technology, WiFi Direct technology, and/or the like and execute various functions to transmit and receive account data (e.g., card number, account type, account balance, account limits, budget data, recent transactions, and/or the like) associated with dynamic transaction card 120. For example, user device 140 could be a mobile device, for example, a smartphone or like device.

User device 140 may include for example, an input/output device 142, and a transaction system 144, and a dynamic transaction card system 146. Input/output device 142 may include, for example, a Bluetooth device or chipset with a Bluetooth transceiver, a chip, and an antenna (e.g., Bluetooth/NFC technology 148). The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the user device 140 (e.g., The Android platform, the iOS platform). Using a Bluetooth API, an application stored on a user device 140 (e.g., a banking application, a financial account application, etc.) or the device may be able to scan for other Bluetooth devices (e.g., a dynamic transaction card 120), query the local Bluetooth adapter for paired Bluetooth devices, establish RFCOMM channels, connect to other devices through service discovery, transfer data to and from other devices or a transaction card 120, and manage multiple connections. A Bluetooth API used in the methods, systems, and devices described herein may include an API for Bluetooth Low Energy (BLE) to provide significantly lower power consumption and allow a user device 140 to communicate with BLE devices that have low power requirements, such as dynamic transaction card 120.

Input/output device 142 may include for example, I/O devices, which may be configured to provide input and/or output to user device 140 (e.g., keyboard, mouse, display, speakers, printers, modems, network cards, etc.). Input/output device 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of user device 140, and a bus that allows communication among the various components of user device 140. Input/output device 142 may include a display, which may include for example output devices, such as a printer, display screen (e.g., monitor, television, and the like), speakers, projector, and the like. Although not shown, each user device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Dynamic transaction card system 146 may work with input/output device 142 to generate and receive account data associated with a dynamic transaction card 120. For example, dynamic transaction card system may include various hardware and software components such as a processor and data storage to store dynamic transaction card data (e.g., cardholder name, address, phone number(s), email address, demographic data, card number, account type, account balance, account limits, budget data, recent transactions and the like).

Transaction system 144 may include various hardware and software components, such as data storage and a processor that may work with input/output device 142 to communicate between a merchant, acquisition system, account provider system, and/or a mobile device to process a transaction, such as a user purchase.

User device 140 may also include various software components, such as mobile banking applications and applications associated with a dynamic transaction card 120, which may include card on/off features that allow a cardholder associated with a user device 140 to enable and disable a transaction card. For example, a card holder may use, for example, a mobile banking application stored on a user device 140 to disable and/or enable accounts associated with a dynamic transaction card 120. In this example, a dynamic transaction card 120 may have account data pre-stored on the dynamic transaction card 120 to associate a number of different accounts with the dynamic transaction card (e.g., debit card, credit card, prepaid card, and/or the like). If a card holder has a credit account established and desires to establish a debit card associated with the dynamic transaction card 120, the card holder may use a user device 140 (e.g., a mobile device) and/or dynamic transaction card 120 to activate the inactive debit account on the dynamic transaction card 120.

Merchant system 150 may include, among other components, a Point-of-Sale (PoS) device, an input/output device 152 (e.g., a transceiver), and an authorization system 154. Merchant system 150 may also include data storage (not shown) to store transaction data and/or approval of charges between an cardholder and the merchant associated with the PoS device.

Figure 2:
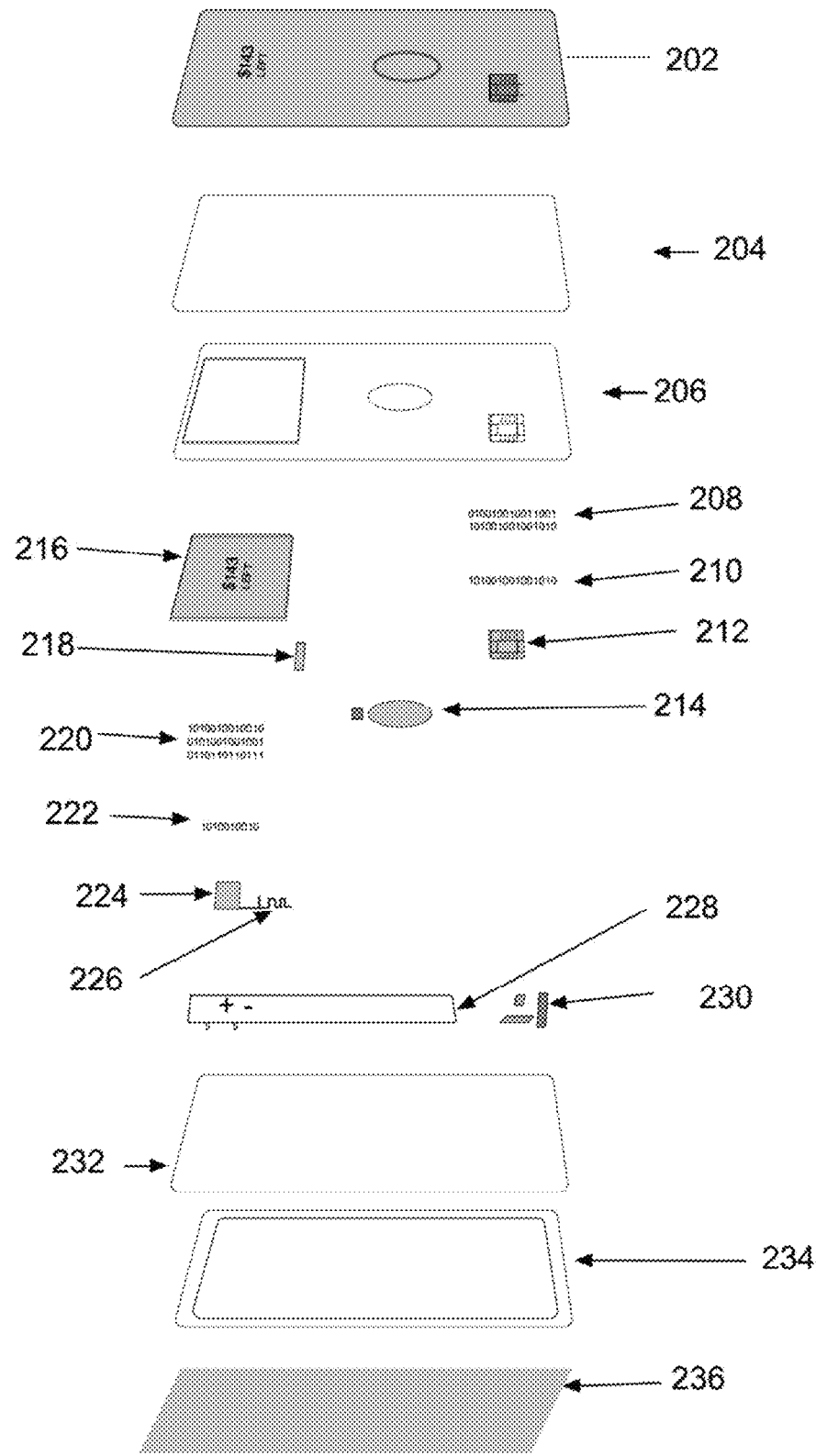
FIG. 2 depicts an example a dynamic transaction card according to certain aspects of the present disclosure.

FIG. 2 is an exploded diagram of dynamic transaction card 120 according to an example. As shown in FIG. 2, dynamic transaction card 120 may include a top output layer 202. The top output layer may be a film covering, a plastic covering, and/or the like. The top output layer 202 may be constructed of scratch-resistant and/or scratch-proof materials. A dynamic transaction card 120 may further include a top protective layer 204, such as a clear scratch-resistant coating and/or scratch-proof material to protect the underlying components. Dynamic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the components of card 120. Dynamic transaction card 120 may further include an applet 208 (e.g., a Java Applet) and applet integration 210 (e.g., Java Applet integration). Applet 208 may include code that executes payments, such as payment made using EMV chip 122. Applet integration 210 may include coded interfaces to allow the microcontroller to interact with the EMV chip 122.

An EMV chip 122 may include a number of contacts that may interact with and/or be connected to a terminal configured to read data stored on a processor of an EMV chip 122. During an EMV transaction, application cryptograms may be used to send and receive data packets between the dynamic transaction card 120 and a terminal, such as a merchant terminal, which may be similar to a terminal included at a merchant 150. For example, data packets may include user authentication information which an acquisition system and/or issuing financial institution may use to authenticate a transaction card 120 during a transaction. Various cryptographic protocols and/or methods may be used in this data transmission and reception process. Moreover, during a transaction issuing financial institutions and/or acquisition systems may return script commands to the EMV chip 122 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Dynamic transaction card 120 may also include one or more sensors 124 to receive input. Sensors 124 may include an activation sensor and/or an operation sensor, which may be combined and/or separate. An activation sensor 124 may activate the dynamic transaction card 120 and an operation sensor may instruct the dynamic transaction card 120 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing with user device 140), input indicative of a password (e.g., a password received via a sensor on the dynamic transaction card and/or a password received on a paired mobile device), and/or the like. An operation sensor may change a display 126 based on received input, conduct a transaction via, for example an EMV chip 122 and/or contactless payment technologies based on received input, attempt a pairing of a card 120 and a user device 140, and/or the like.

Display 126 may be provided within the transaction card 120. By way of example, a display 126 may be activated via a sensor 124. For example, a display may be activated via a touch sensor, where a user is required to tap a location on dynamic transaction card 120 a specific number of times and/or for a specific length of time (e.g., double tap, triple tap, one long tap followed by one short tap, and/or the like).

In response to the received sensor input, a display 126 may be activated to display particular data, such as data associated with a transaction history, account balance, spending limit, budget categories, budget spending, budget limits, and/or the like.

A dynamic transaction card 120 may include a display driver 218 that translates instructions from microcontroller 224 into display images to be displayed using display components 126. Display driver 218 may include an integrated circuit (IC), a state machine, and/or the like that provides an interface function between the display and the microcontroller 224. Display driver 218 may include memory (e.g., RAM, Flash, ROM, and/or the like) and/or firmware that includes font display data.

Dynamic transaction card 120 may include firmware 220 and/or a bootloader 222. Bootloader 222 may include code to be executed as a dynamic transaction card 120 is activated and before any operating system, firmware, or other code is executed on the dynamic transaction card 120. Bootloader may be activated via a sensor 124 and energy storage component 228 of the dynamic transaction card 120. Bootloader 222 may activate and/or load an application and/or program upon detection that card 120 has been inserted into a terminal, charger, and/or the like. Bootloader 222 may only be active during a short interval after the card 120 powers up. Card 120 may also be activated using program code that may be flashed directly to a microprocessor such as microcontroller 224, EMV processor 122, and/or the like. Card 120 may not use a bootloader 222 but instead may cycle between a sleep state and an active state using program code and/or memory.

A dynamic transaction card 120 may include microcontroller 224 and antenna 226. Antenna 226 may include, for example, a loop antenna, a fractal antenna, and/or the like. Antenna 226 may transmit to and receive signals from a mobile device, such as user device 140, to conduct transactions and display data as described throughout the specification. Microcontroller 224 may communicate with EMV chip 122, applet 208, applet integration 210, sensor(s) 124, power management 230, antenna 226, energy storage component 228, display 126, display driver 218, firmware 220, bootloader 222, and/or any other component of dynamic transaction card 120. Microcontroller 224 may control the card operations to conduct transactions and/or display data as described throughout this specification.

Dynamic transaction card 120 may include an energy storage component 228. Although energy storage component is depicted as a single component, energy storage component 228 may include a series of energy storage components. By way of example, energy storage component 228 may include a lithium polymer battery, a lithium-metal battery, lithium-ceramic battery, and/or any other type of battery.

Dynamic transaction card 120 may include a power management component 230 that may manage the charging and discharging of energy storage component 228. Power management component 230 may convert voltage to a predetermined level in order to operate dynamic transaction card 120 as discussed throughout the specification. Power management component 230 and/or energy storage 228 may include, for example, solar power cells to convert solar energy into an electrical current within a solar panel. Power management component 230 and/or energy storage component 228 may include connections to sensors 124 to receive input and activate dynamic transaction card 120 (e.g., motion input, thermal input, manual input, touch input, and/or the like).

One of ordinary skill will recognize in light of the present disclosure that dynamic transaction card 120 may be passively powered (without energy storage component 228 or another local power supply). For example, power management component 230 can control power received from the merchant system 150 to power dynamic transaction card 120, such as when the dynamic transaction card is inserted into a transaction terminal. However, this is merely an example and, in some cases, dynamic transaction card 120 may be passively powered by NFC or another wireless signal. In some cases, power management component 230 may utilize the passively-derived power to charge energy storage component 228.

A flexible printed circuit board (PCB) 232 may be included in dynamic transaction card 120. PCB 232 may include a PCB mounted in a flexible plastic substrate, such as for example, a polyimide, polyether ether ketone, and/or a transparent conductive polyester film. Dynamic transaction card 120 may include a chassis 234 as a frame or supporting structure. Chassis 234 may be a mount for a flexible PCB 232 and may be constructed out of flexible or semi-flexible material as well. Chassis 234 may be included within or separate from a card backing 236. Card backing 236 may be made of similar material to that of the output layer 202 and/or the top protective layer 204. Card backing 236 may include a magnetic stripe that may be read using a magnetic stripe reader. A magnetic stripe may store tracks of data that are used to conduct a transaction using a dynamic transaction card 120. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 120 that is paired to a mobile device via, for example, Bluetooth, BLE, RFID, WiFi Direct and/or other wireless technologies, may receive new track data. The new track data may be unformatted, encrypted, encoded, and/or the like when the new track data is transmitted from the mobile device to the dynamic transaction card 120. Upon receipt of the new track data, the new track data may be routed to a microprocessor, such the processor of EMV chip 122 and/or microcontroller 224. EMV chip 122 and/or microcontroller 224 may convert, decrypt, and/or decode the received new track data to ensure compliance with any standards. Once decrypted, decoded, and/or formatted, the new track data may be save on the tracks of the magnetic stripe. The magnetic stripe may be deleted and then the new track data may be recorded onto the tracks. In this manner, track data stored on a magnetic stripe may be altered at any time upon pairing a dynamic transaction card 120 with a mobile device (e.g., user device 140).

Figure 3:
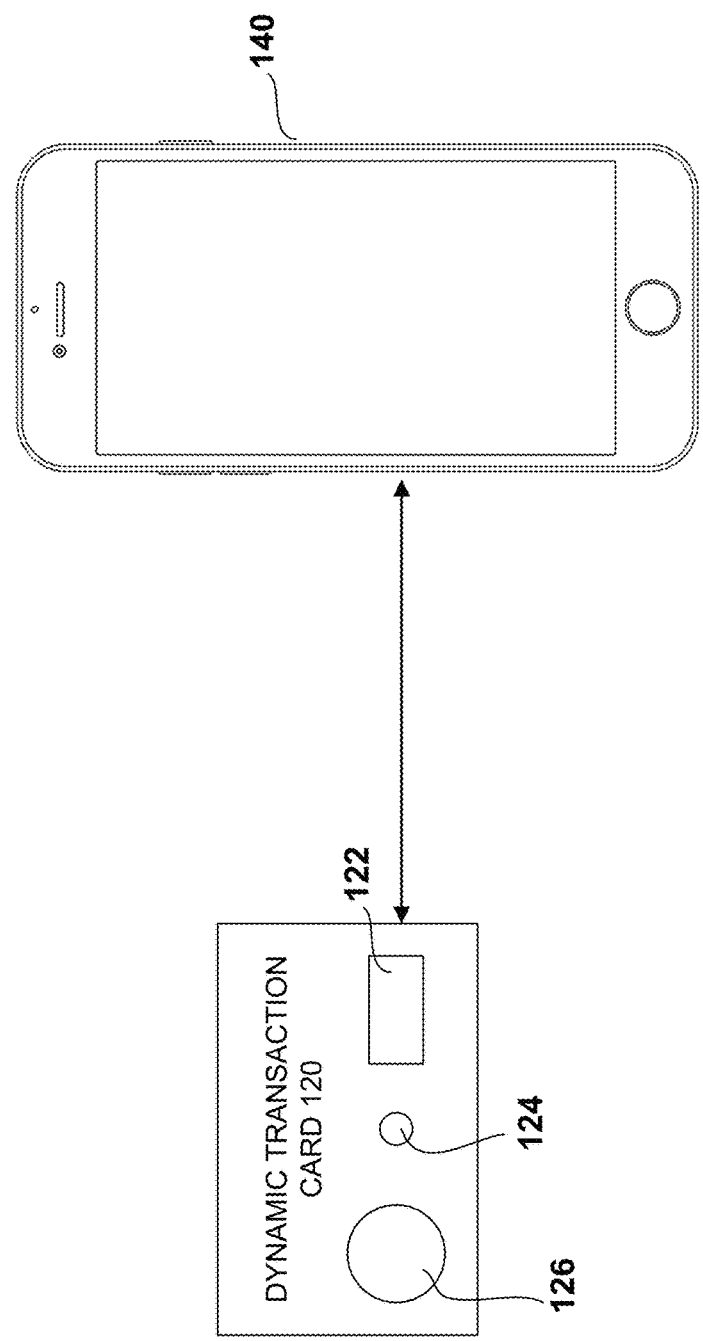
FIG. 3 depicts an example of a system including a dynamic transaction card according to certain aspects of the disclosure.

FIG. 3 illustrates a system associated with the use of a dynamic transaction card 120. The example system 300 in FIG. 3 may enable a user device 140 to provide data updates to a dynamic transaction card 120 via a short-range communication. For example, data received at user device 140 may be transmitted to dynamic transaction card 120 where it is received via antenna 226. Data may be received and/or transmitted using, for example a mobile banking application that maintains and/or creates a secure connection with a financial institution to send and/or receive data related to an account associated with the financial institution. For example, a mobile banking application include send and/or receive data related to a credit account, a debit account, a prepaid account, a loyalty account, a rewards account, and/or the like. Data may also include track data that may be updated upon demand.

Upon activation of dynamic transaction card via, for example, sensor 124, a data request may be transmitted to a user device 140 for updated information, where user device 140 may request updated data from a financial institution described in FIG. 3. Data received at dynamic transaction card 120 may be stored on transaction card 120 and/or may be displayed via display 126.

Figure 4:
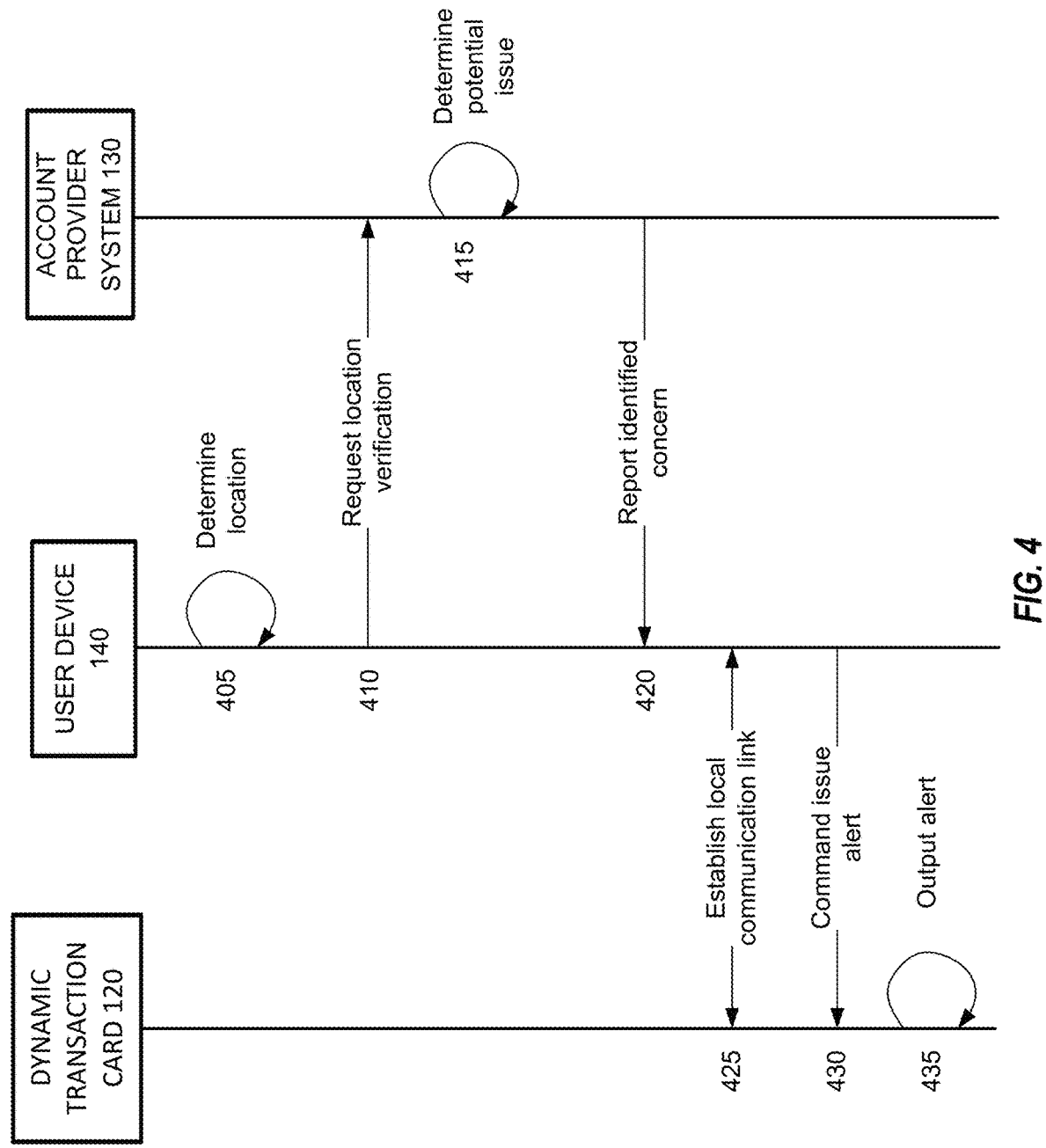
FIGS. 4-7 are timing diagrams of example methods according to embodiments.

FIG. 4 is a timing diagram 400 illustrating a method according to an example. The method may be performed, as an example, by dynamic transaction card 120, account provider system 130, and user device 140. Referring to FIG. 4, user device 140 may determine 405 a current location. For example, user device 140 may include a GPS system that can determine a geographic location of the user device 140. In some cases, user device 140 can determine a business located at the GPS location and utilize the business information as a location. In some cases, a business (e.g., a store or a merchant) may output signals (e.g., through beacons) indicating the location or name of the business. User device 140 may be configured to retrieve and decode the transmitted information to determine the location.

User device 140 requests 410 location verification from account provider system 130. For example, user device 140 may transmit the location information to account provider system 130, and request verification that there is are no security issues for the location. For example, user device 140 may transmit the location information to determine if the current location has a higher crime rate, or a higher rate regarding particular crimes, such as pick-pocketing.

Account provider system 130 determines 415 whether there are potential issues with the current location. For example, account provider system 130 may maintain a database of potential security issues by location, and search the database for any issues related to the current location. Alternatively, account provider system 130 may communicate with a remote database or security service to determine whether there are any potential issues with the current location. As an example, account provider system 130 may determine whether a merchant at the current location is potentially compromised from a database generated by automated fraud-detection rules, reporting, and/or investigations. If a potential security issue is identified, account provider system 130 reports 420 any identified concerns to user device 140.

User device 140 receives the reported concern and established 425 a local communication link with dynamic transaction card 120. For example, user device 140 may transmit a request to dynamic transaction card 120 using Bluetooth, Bluetooth Low Energy (BLE), RFID, WiFi Direct, and/or NFC technologies. The communication link may be handshaking verification between user device 140 and dynamic transaction card 120. User device 140 then commands 430 dynamic transaction card 120 to output an alert regarding the potential security issue.

Dynamic transaction card 120 outputs 435 an alert related to the potential security issue. For instance, dynamic transaction card 120 may output a red light (e.g., through LED 126) and/or a text alert through display 126. A user/customer may identify the alert and may act accordingly. For example, the user may change payment methods, decline to proceed with a transaction, and/or be more cognizant or diligent of potential risks. In some cases, account provider system 130 may transmit a temporary transaction card number to user device 140, which user device 140 then forwards to dynamic transaction card 120. Dynamic transaction card 120 may utilize the temporary card number lieu of its permanent card number, for example, if the merchant is suspected to have security issues. The user may determine to use the temporary card number through input, e.g., through an input to sensor 124.

Figure 5:
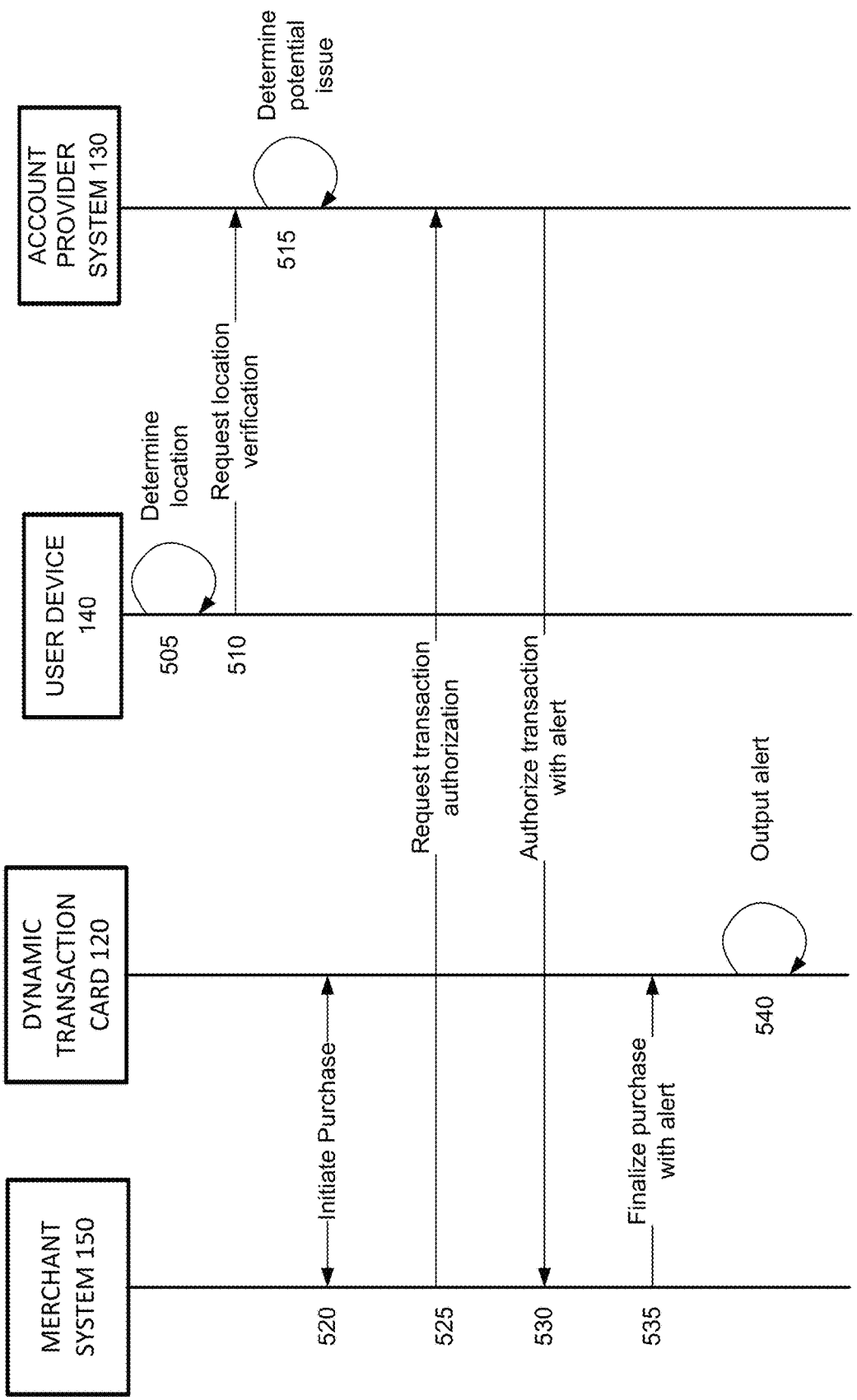

FIG. 5 is a timing diagram 500 illustrating a method according to an example. The method may be performed, as an example, by dynamic transaction card 120, account provider system 130, user device 140, and merchant system 150. Referring to FIG. 5, user device 140 may determine 505 a current location and requests 510 location verification from account provider system 130. Account provider system 130 then determines 515 whether there are potential issues with the current location. Determining 505 a location, requesting 510 location verification and determining 515 potential issues may be similar to similar processes discussed above with reference to FIG. 4.

Merchant system 150 (e.g., a PoS device) and dynamic transaction card 102 may initiate a transaction. For example, a user may insert dynamic transaction card 120 into a card-reading terminal. Merchant system 150 and dynamic transaction card 120 may exchange information (e.g., card number, validation code, encryption codes) to effectuate a transaction. Merchant system 150 may request 525 transaction authorization from account provider system 130, for example, over a payment network. Account provider system may then authorize 530 the transaction, but include an alert for dynamic transaction card 120. The alert can be based on the potential issue determined from the location information provided by user device 140. The merchant system 150 may finalize 535 the purchase and transmit the alert to the dynamic transaction card. In this way, a payment terminal or other merchant system 150 may be leveraged to enhance the capabilities of the dynamic transaction card 120. The dynamic transaction card can then output 540 the alert, for example, similar to that described above with reference to FIG. 4.

Figure 6:
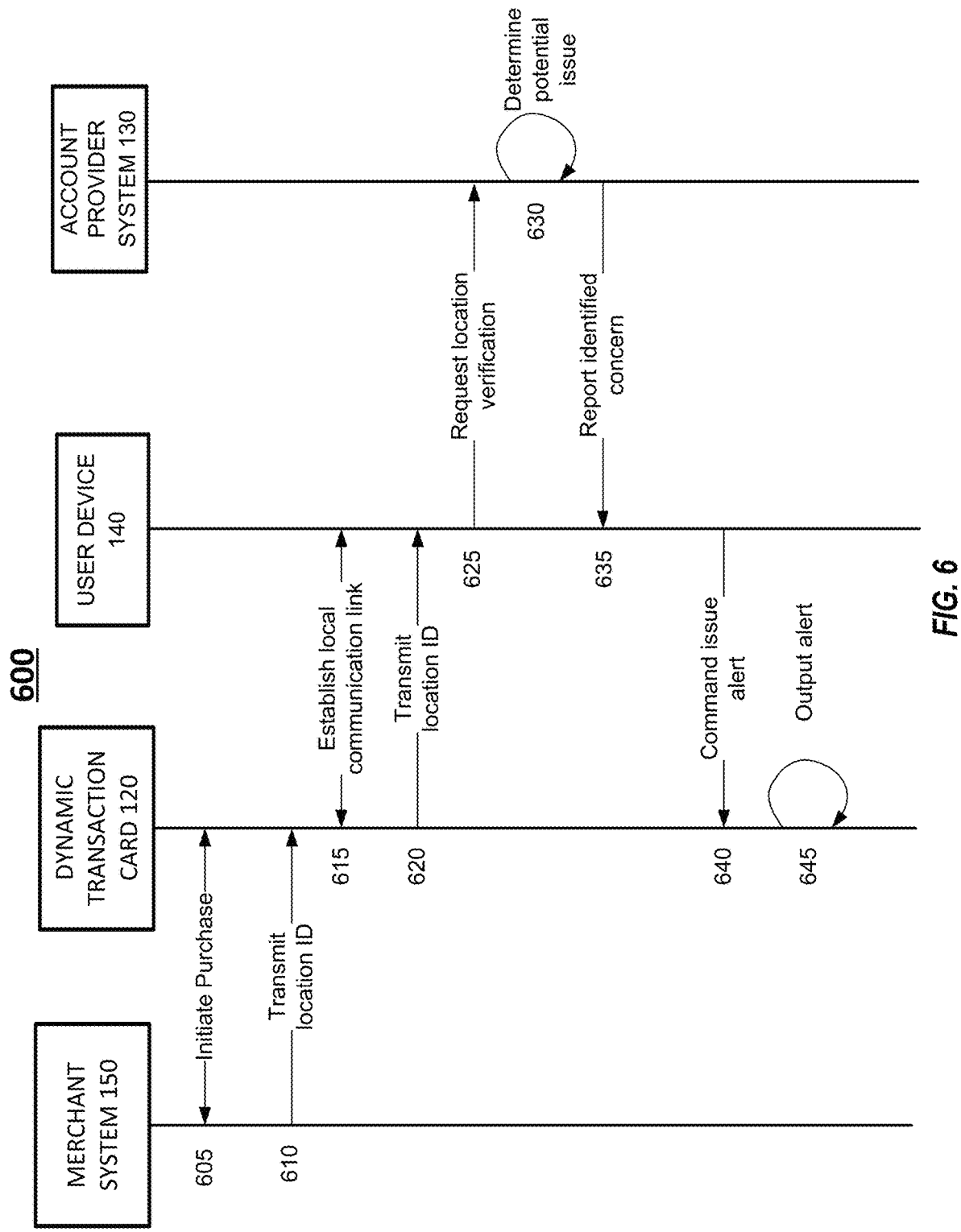

FIG. 6 is a timing diagram 600 illustrating a method according to an example. The method may be performed, as an example, by dynamic transaction card 120, account provider system 130, user device 140, and merchant system 150. Referring to FIG. 6, merchant system 150 (e.g., a PoS device) and dynamic transaction card 102 may initiate a transaction. For example, a user may insert dynamic transaction card 120 into a card-reading terminal. Merchant system 150 and dynamic transaction card 120 may exchange information (e.g., card number, validation code, encryption codes) to effectuate a transaction. Merchant system 150 may transmit 610 location information to dynamic transaction card 120. For example, merchant system 150 may provide geographic coordinates (e.g., GPS coordinates), a street address, or the like to dynamic transaction card 120. In some cases, the location information could include a merchant identifier (merchant ID) corresponding to the particular merchant and/or merchant system 150.

Dynamic transaction card 120 then establishes 615 a communication link, e.g., a local communication link, with user device 140. For example, dynamic transaction card 120 may emit a short-range signal detectable by user device 140 using Bluetooth, Bluetooth Low Energy (BLE), RFID, WiFi Direct, and/or NFC technologies. The communication link may be hand-shaking verification between user device 140 and dynamic transaction card 120. Dynamic transaction card then provides 620 the location identification to user device 140.

User device 140 requests 625 location verification from account provider system 130. For example, user device 140 may transmit the location information to account provider system 130, and request verification that there is are no security issues for the location. For example, user device 140 may transmit the location information to determine if the current location has a higher crime rate, or a higher rate regarding particular crimes, such as pick-pocketing.

Account provider system 130 determines 630 whether there are potential issues with the current location. For example, account provider system 130 may maintain a database of potential security issues by location, and search the database for any issues related to the current location. Alternatively, account provider system 130 may communicate with a remote database or security service to determine whether there are any potential issues with the current location. As an example, account provider system 130 may determine whether a merchant at the current location is potentially compromised from a database generated by automated fraud-detection rules, reporting, and/or investigations. If a potential security issue is identified, account provider system 130 reports 635 any identified concerns to user device 140.

User device 140 then commands 640 dynamic transaction card 120 to output an alert regarding the potential security issue, e.g., utilizing the communication link. Dynamic transaction card 120 outputs 645 an alert related to the potential security issue. For instance, dynamic transaction card 120 may output a red light (e.g., through LED 126) and/or a text alert through display 126. A user/customer may identify the alert and may act accordingly. For example, the user may change payment methods, decline to proceed with a transaction, and/or be more cognizant or diligent of potential risks. In some cases, account provider system 130 may transmit a temporary transaction card number to user device 140, which user device 140 then forwards to dynamic transaction card 120. Dynamic transaction card 120 may utilize the temporary card number lieu of its permanent card number, for example, if the merchant is suspected to have security issues. The user may determine to use the temporary card number through input, e.g., through an input to sensor 124. In some cases, account provider system 130 may transmit an alert to user device 140 such that user device 140 outputs a notification additionally to dynamic transaction card 120.

Figure 7:
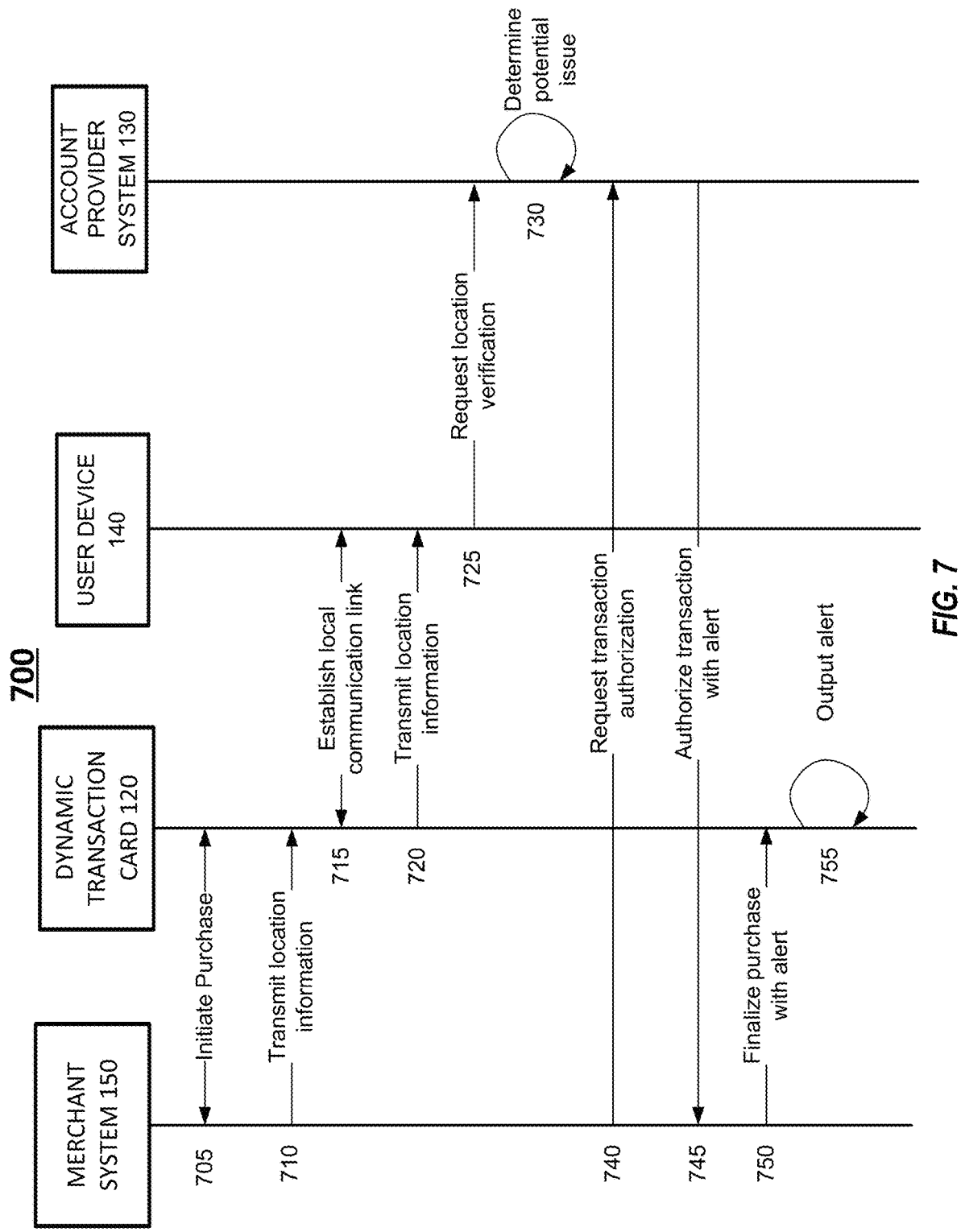

FIG. 7 is a timing diagram 700 illustrating a method according to an example. The method may be performed, as an example, by dynamic transaction card 120, account provider system 130, user device 140, and merchant system 150. Referring to FIG. 7, merchant system 150 (e.g., a PoS device) and dynamic transaction card 102 may initiate 705 a transaction, and merchant system 150 may transmit 710 location information to dynamic transaction card 120. Dynamic transaction card 120 then establishes 615 a communication link, e.g., a local communication link, with user device 140 and transmits 720 the location information to user device 140. User device requests 725 location verification from account provider system 130. Account provider system 130 then determines 730 whether there are potential issues with the current location. Initiating 705 a purchase, transmitting 710 location information, establishing 715 a communication link location, transmitting 720 location information, requesting 725 location verification and determining 730 potential issues may be similar to similar processes discussed above with reference to FIG. 6.

Merchant system 150 may request 740 transaction authorization from account provider system 130, for example, over a payment network. Account provider system 130 may then authorize 745 the transaction, but include an alert for dynamic transaction card 120. The alert can be based on the potential issue determined from the location information provided by user device 140. The merchant system 150 may finalize 750 the purchase and transmit the alert to the dynamic transaction card. In this way, a payment terminal or other merchant system 150 may be leveraged to enhance the capabilities of the dynamic transaction card 120. The dynamic transaction card can then output 755 the alert, for example, similar to that described above with reference to FIG. 6.

While in FIGS. 5-7 account provider system 130 authorizes 530/640/745 the transaction, this is merely an example. In some cases, account provider system 130 may decline the transaction, and provide an alert to dynamic transaction card 120 through the merchant system 150 indicating why the transaction was declined (e.g., based on the determined potential issue). These and other changes would be apparent to one of ordinary skill in light of the present disclosure.

An embodiment of the present disclosure may be implemented according to at least the following:

Clause 1: A dynamic transaction card including: one or more light emitting elements; a transceiver; and an embedded microprocessor configured to: receive, from a transaction terminal, a location information corresponding to a current location of the transaction terminal; wirelessly transmit, via the transceiver and to a mobile device, the location information; receive an indication that a location-specific security concern exists; and in response to receiving the indication, control the one or more light emitting elements to display a visual indication corresponding to the location-specific security concern.

Clause 2: The dynamic transaction card of clause 1, wherein the indication that location-specific security concern exists is receive from the mobile device via the transceiver.

Clause 3: The dynamic transaction card of clause 2, wherein the mobile device wirelessly transmits the location information to a backend system for determining whether location-specific security concern exists.

Clause 4: The dynamic transaction card of clause 1, wherein the indication that the location-specific security concern exists is received from the transaction terminal.

Clause 5: The dynamic transaction card of any of clauses 1-4, wherein the embedded microprocessor is further configured to: receive, from the mobile device, a temporary transaction account number; and provide the temporary transaction account number to the transaction terminal to effectuate a purchase in response to the location-specific security concern existing.

Clause 6: The dynamic transaction card of any of clauses 1-5, wherein the location information includes a merchant identifier corresponding to a merchant associated with the transaction terminal.

Clause 7: The dynamic transaction card of any of clauses 1-6, wherein the microprocessor is configured to receive the location information from the transaction terminal during a transaction authorization attempt.

Clause 8: A method including: receiving, at a backend system, a transaction request for a dynamic transaction card; receiving, at the backend system, location information corresponding to the transaction request; determining, by the backend system, that a location-specific security concern exists; and instructing the dynamic transaction card to output a visual indication that the location-specific security concern exists.

Clause 9: The method of clause 8, wherein the location information is received as part of the transaction request.

Clause 10: The method of clause 8 or clause 9, wherein the backend system instructs the dynamic transaction card to output the visual indication that the location-specific security concern exists through a transaction terminal in communication with the dynamic transaction card.

Clause 11: The method of clause 8 or clause 9, wherein the backend system instructs the dynamic transaction card to output the visual indication that the location-specific security concern exists through a mobile device associated with the dynamic transaction card.

Clause 12: The method of clause any of clauses 8-11, wherein the dynamic transaction card receives the location information from a transaction terminal associated with the transaction request and transmits the location information to a mobile device associated with the dynamic transaction card, and the backend system receives the location information from the mobile device.

Clause 13: The method of any of clauses 8-12, wherein the location information includes a merchant identifier corresponding to a merchant associated with the transaction request.

Clause 14: A mobile device including: a transceiver configured to communicate with a dynamic transaction card; a processor; and a memory having stored thereon computer instructions that, when executed by the processor, control the processor to: determine a location information associated with a current location of the dynamic transaction card; output, to a backend system, the location information; receive, from the backend system, an indication that a location-specific security concern exists; and output, to the dynamic transaction card, an instruction to display a visual indication that the location-specific security concern exists.

Clause 15: The mobile device of clause 14 further including a global positioning system (GPS), wherein the instructions, when executed by the processor, further control the processor to: identify a current location of the mobile device based on the GPS as the location information.

Clause 16: The mobile device of clause 15, when executed by the processor, further control the processor to determine a merchant identifier based on a merchant location corresponding the current location of the mobile device and output the merchant identifier as the location information to the backend system.

Clause 17: The mobile device of any of clauses 14-16, wherein the instructions, when executed by the processor, control the processor to output the instruction to display the visual indication that the location-specific security concern exists prior to an attempted transaction using the dynamic transaction card.

Clause 18: The mobile device of any of clauses 14-16, wherein the dynamic transaction card receives the location information from a transaction terminal associated with a merchant as part of an attempted transaction, and the mobile device receives the location information from the dynamic transaction card.

Clause 19: The mobile device of any of clauses 14-18, wherein the location information includes a merchant identifier.

Clause 20: The mobile device of any of clauses 14-19, wherein the instructions, when executed by the processor, control the processor to: receive, from the backend system, a temporary transaction account number; and provide the temporary transaction account number to the dynamic transaction card to effectuate a purchase in response to the location-specific security concern existing.

Example Use Case

The following example use case describes examples of a typical flow patterns. It is intended solely for explanatory purposes and not in limitation. A financial institution may subscribe to a blockchain network to which several other unaffiliated financial institutions are also subscribers. The blockchain network may be a distributed network and include a ledger. The blockchain network may track transactions by account-holders at one or more of the financial institutions to monitor attempted money-laundering or counterfeit transactions.

An account-holder "AH" may have a credit or debit account with a financial institution. AH can access the account utilizing a dynamic transaction card provided by the financial institution. AH may be preparing to make a purchase using the dynamic transaction card and a nearby mobile device (e.g., a smartphone) associated with AH.

As an example, when AH walks into the store, the mobile device determines that AH is likely to be making a purchase and alerts the financial institution (e.g., through an application executing on the mobile device) of AH's current location. The financial institution then determines whether there are any potential security concerns with the current location. If one or more security concerns are found, the financial institution will instruct the mobile device to pair with the dynamic transaction card to issue an alert through the dynamic transaction card.

In another case, when AH walks into the store, the mobile device determines that AH is likely to be making a purchase and alerts the financial institution (e.g., through an application executing on the mobile device) of AH's current location. The financial institution then determines whether there are any potential security concerns with the current location. If one or more security concerns are found, when AH attempts to make a purchase using the dynamic transaction card, the financial institution may communicate with the dynamic transaction card through a point-of-sale device (e.g., a transaction terminal) and instruct the dynamic transaction card to issue an alert through the dynamic transaction card.

In another case, when AH attempts to make a purchase using the dynamic transaction card, the dynamic transaction card may communicate with a point-of-sale device (e.g., a transaction terminal) to determine a current location (e.g., a geographic location or a merchant identifier). The dynamic transaction card may pair with the mobile device and provide this location information to the mobile device. The mobile device alerts the financial institution (e.g., through an application executing on the mobile device) of AH's current location. The financial institution then determines whether there are any potential security concerns with the current location. If one or more security concerns are found, when AH, the financial institution may communicate with the dynamic transaction card either through the mobile device or the transaction terminal to issue an alert to AH.

What is claimed is:

1. A dynamic transaction card comprising:
   one or more light emitting elements;
   a transceiver; and
   an embedded microprocessor;
   memory in communication with the embedded microprocessor and storing instructions that are configured to cause the microprocessor to:
     receive, from a transaction terminal, a location information corresponding to a current location of the transaction terminal;
     wirelessly transmit, via the transceiver and to a mobile device, the location information;
     receive an indication that a location-specific security concern exists; and
     in response to receiving the indication, control the one or more light emitting elements to display a visual indication corresponding to the location-specific security concern.

2. The dynamic transaction card of claim 1, wherein the indication that location-specific security concern exists is received from the mobile device via the transceiver.

3. The dynamic transaction card of claim 1, wherein the location information corresponds to a transaction request.

4. The dynamic transaction card of claim 1, wherein the indication that the location-specific security concern exists is received from the transaction terminal.

5. The dynamic transaction card of claim 1, wherein the memory stores further instructions that are configured to cause the microprocessor to:
   receive, from the mobile device, a temporary transaction account number; and
   provide the temporary transaction account number to the transaction terminal to effectuate a purchase in response to the location-specific security concern existing.

6. The dynamic transaction card of claim 1, wherein the location information comprises a merchant identifier corresponding to a merchant associated with the transaction terminal.

7. The dynamic transaction card of claim 1, wherein the memory stores further instructions that are configured to cause the microprocessor to:
   receive the location information from the transaction terminal during a transaction authorization attempt.

8. The dynamic transaction card of claim 1, wherein the location-specific security concern is that the current location has a higher crime rate.

9. The dynamic transaction card of claim 1, wherein the location-specific security concern is that the transaction terminal is potentially fraudulently compromised.

* * * * *